(12) United States Patent
Beitzen-Heineke et al.

(10) Patent No.: US 10,647,365 B2
(45) Date of Patent: May 12, 2020

(54) KIT COMPRISING A STILT VEHICLE AND A TRAILER FOR TRANSPORTING SAME

(71) Applicant: BIOCARE GESELLSCHAFT FÜR BIOLOGISCHE SCHUTZMITTEL MBH, Einbeck (DE)

(72) Inventors: Wilhelm Beitzen-Heineke, Einbeck (DE); Stephan Schmidt, Biedritz (DE); Martin Schünemann, Magdeburg (DE); Hannes Heidfeld, Medgeburg (DE); Ralf Hinzelmann, Magdeburg (DE)

(73) Assignee: BIOCARE GESELLSCHAFT FUR BIOLOGISCHE SCHUTZMITTEL MBH, Einbeck (DE)

( * ) Notice: Subject to any disclaimer, the term of this patent is extended or adjusted under 35 U.S.C. 154(b) by 0 days.

(21) Appl. No.: 16/238,395

(22) Filed: Jan. 2, 2019

(65) Prior Publication Data

US 2019/0176911 A1 Jun. 13, 2019

Related U.S. Application Data

(63) Continuation of application No. PCT/EP2017/066655, filed on Jul. 4, 2017.

(30) Foreign Application Priority Data

Jul. 5, 2016 (DE) .......................... 10 2016 112 292

(51) Int. Cl.
*B62D 49/06* (2006.01)
*A01B 61/00* (2006.01)
(Continued)

(52) U.S. Cl.
CPC .......... *B62D 49/0678* (2013.01); *A01B 61/00* (2013.01); *A01M 7/0042* (2013.01);
(Continued)

(58) Field of Classification Search
CPC ...... A01B 51/023; A01M 7/0042; B60P 1/02; B62D 49/0678; B62D 49/0607; B60G 2300/40

See application file for complete search history.

(56) References Cited

U.S. PATENT DOCUMENTS 3,154,164 A * 10/1964 Shaw .................. B60B 27/0026
180/209
4,350,222 A * 9/1982 Lutteke .............. B62D 49/0678
180/209

(Continued)

FOREIGN PATENT DOCUMENTS

EP 2 448 808 B1 6/2010
FR 2 550 049 A1 8/1983

OTHER PUBLICATIONS

International search report issued for corresponding International Patent Application No. PCT/EP2017/066655, dated Sep. 13, 2017 with an English Translation.

(Continued)

*Primary Examiner* — Mark C Hageman
(74) *Attorney, Agent, or Firm* — Myers Wolin, LLC

(57) ABSTRACT

In a kit comprising a self-propelled two-track stilt vehicle and a transportation trailer, a lifting device, braced on the trailer, is provided that acts on central elements of the running and carrying structure of the stilt vehicle. The running and carrying structure of the stilt vehicle having four wheels comprises, oriented transversely relative to the travel direction, front and rear transverse structures, on which two stilt structures respectively having a wheel-carrying unit that carries at least one wheel are disposed on both sides at the end. The transverse structures are constructed in multiple parts having a middle piece and left and right end pieces, which can be fixed in various width positions. The stilt structures are constructed in multiple (Continued)

parts having primary parts connected to the associated end piece of the transverse structure and secondary parts, fixable thereon in various height positions and on which associated wheel-carrying units are disposed.

22 Claims, 11 Drawing Sheets

(51) Int. Cl.
| | |
|---|---|
| A01M 7/00 | (2006.01) |
| B60G 17/015 | (2006.01) |
| B60K 7/00 | (2006.01) |
| B60P 1/02 | (2006.01) |
| B60P 3/06 | (2006.01) |
| B62D 5/04 | (2006.01) |
| B62D 63/06 | (2006.01) |
| A01B 51/02 | (2006.01) |
| B60P 7/135 | (2006.01) |

(52) U.S. Cl.
CPC ......... *B60G 17/015* (2013.01); *B60K 7/0007* (2013.01); *B60P 1/02* (2013.01); *B60P 3/064* (2013.01); *B62D 5/04* (2013.01); *B62D 63/061* (2013.01); *A01B 51/023* (2013.01); *B60G 2500/30* (2013.01); *B60P 7/135* (2013.01); *Y02A 40/294* (2018.01)

(56) References Cited

U.S. PATENT DOCUMENTS

| | | | | |
|---|---|---|---|---|
| 4,897,987 | A | * | 2/1990 | Spalla ................ B62D 33/0636 56/16.7 |
| 5,039,129 | A | | 8/1991 | Balmer |
| 8,205,893 | B2 | * | 6/2012 | Peterson ............... B60B 35/001 280/6.157 |
| 2002/0053795 | A1 | | 5/2002 | Schaffer |
| 2005/0173601 | A1 | * | 8/2005 | Hestand ................... B60P 1/02 248/129 |
| 2011/0024218 | A1 | | 2/2011 | Grosjean |
| 2011/0073026 | A1 | | 3/2011 | Martin et al. |
| 2015/0034736 | A1 | | 2/2015 | Jones et al. |
| 2015/0102593 | A1 | | 4/2015 | Slawson |

OTHER PUBLICATIONS

Written Opinion of the International Searching Authority for corresponding International Patent Application No. PCT/EP2017/066655, dated Sep. 13, 2017 with an English Translation.

* cited by examiner

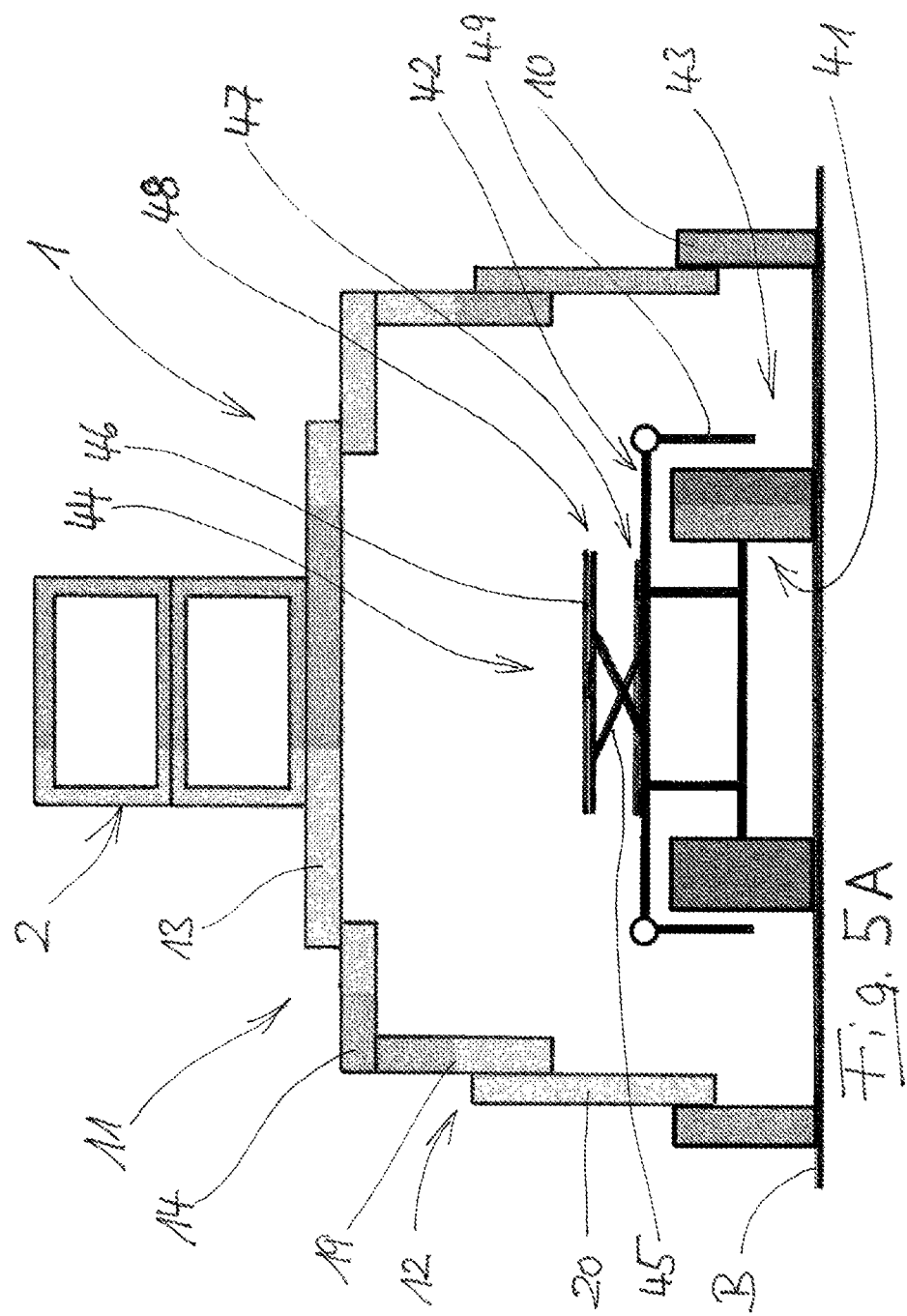

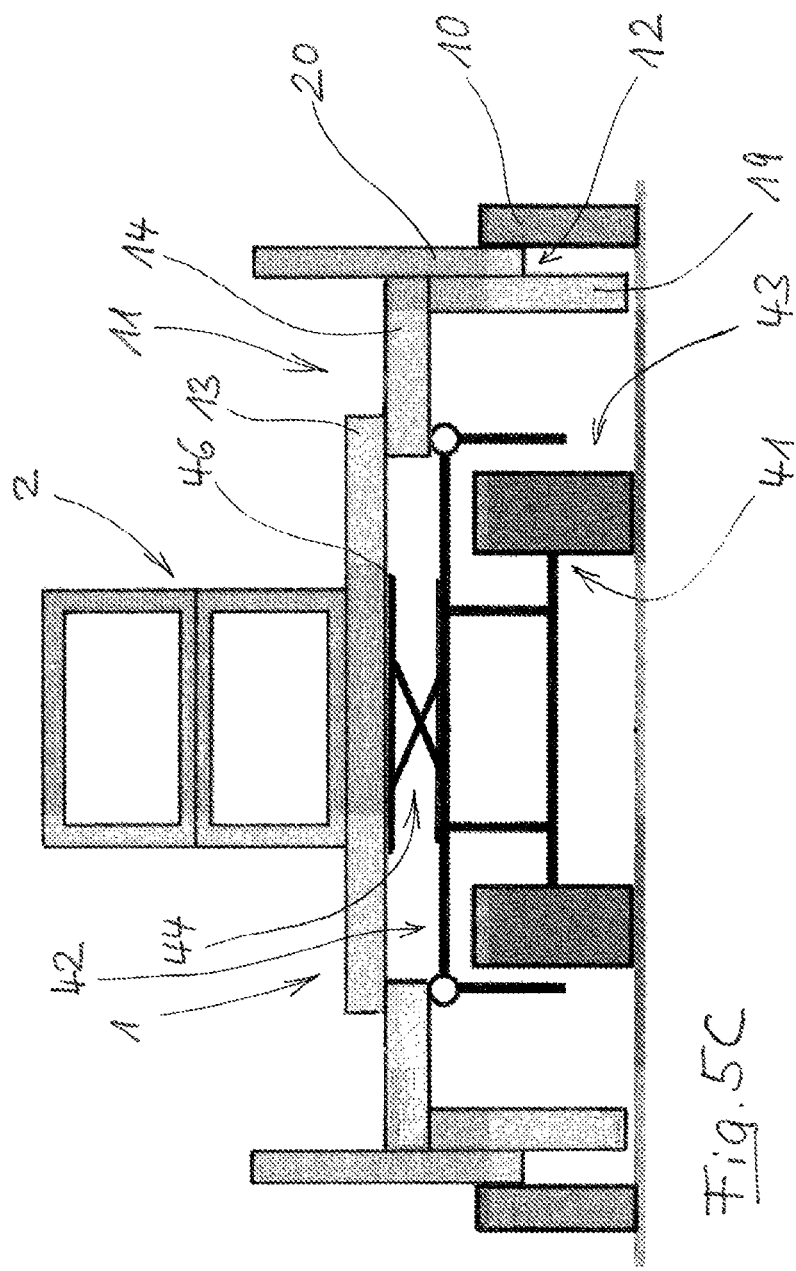

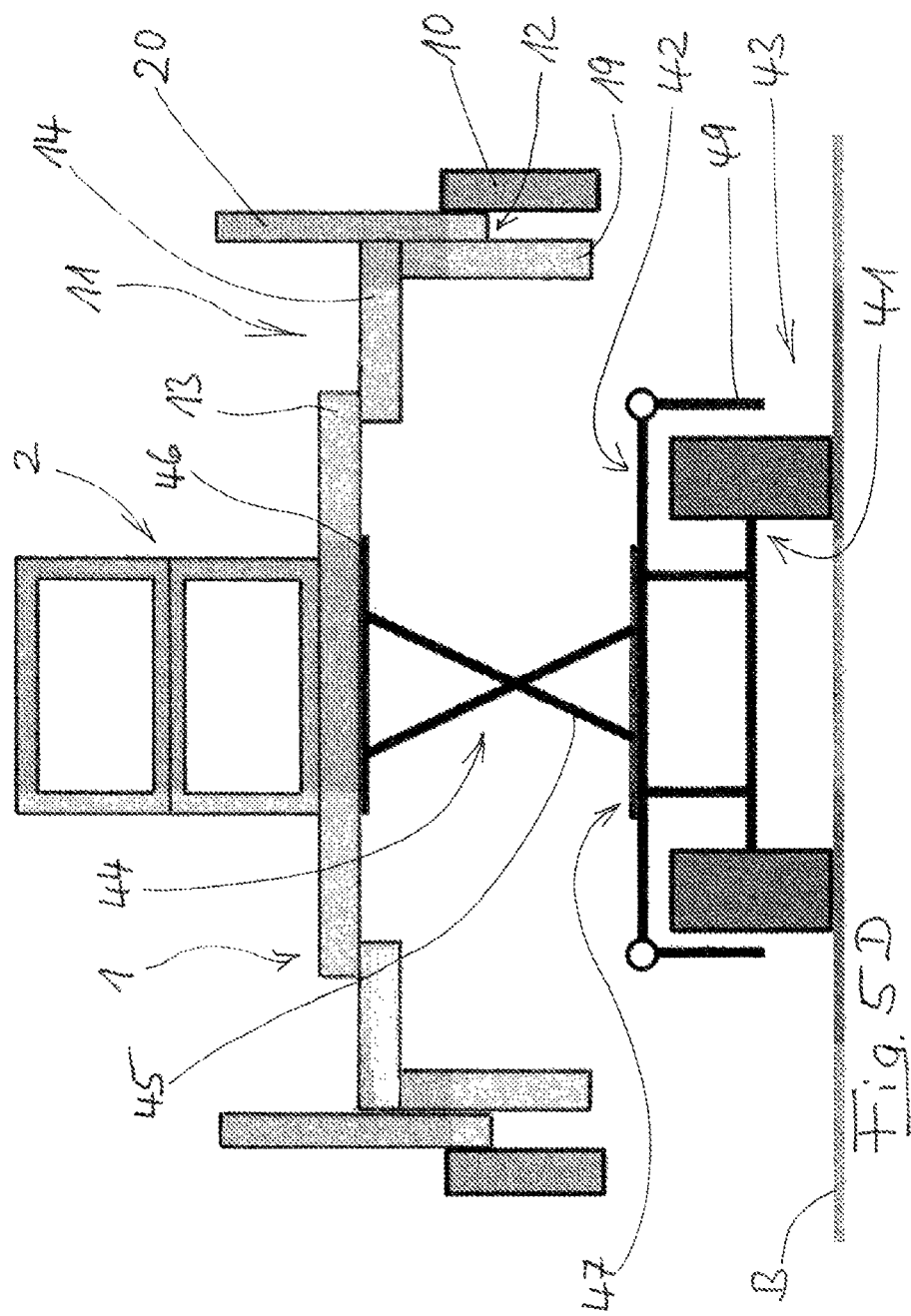

KIT COMPRISING A STILT VEHICLE AND A TRAILER FOR TRANSPORTING SAME

CROSS REFERENCE TO RELATED APPLICATIONS

This application is a continuation under 35 U.S.C. § 120 of International Application PCT/EP2017/066655, filed Jul. 4, 2017, which claims priority to German Application No. 10 2016 112 292.0, filed Jul. 5, 2016, the contents of each of which are incorporated by reference herein.

FIELD OF THE INVENTION

The present invention relates to a kit comprising a self-propelled two-track stilt vehicle, especially for agricultural and forestry applications, and a trailer used to transport the stilt vehicle and having a cargo bed.

BACKGROUND

Self-propelled two-track stilt vehicles having a running and carrying structure provided with four wheels are used especially in the area of agricultural, horticultural and forestry applications (including viticulture). By virtue of their design, they are suitable for traversing agricultural, horticultural and forestry crops having plants cultivated in rows (limited plant height), wherein at least one plant row is situated between the two tracks. Typically, such said self-propelled two-track stilt vehicles are used for care of the crop (including fertilization and pest control) as well as for harvesting. For example, FR 2550049 A1, US 2015/0034736 A1 and EP 2448808 B1 disclose various known self-propelled two-track stilt vehicles.

Although the requirements imposed on such self-propelled two-track stilt vehicles vary in detail from application situation to application situation, it is nevertheless generally true that the stilt vehicle (despite the relatively high center of gravity) should have tilting stability that permits safe travel even over uneven or sloping terrain, be maneuverable, have effective drive power sufficient, for example, to permit travel even on steep slopes and cause the lowest possible ground pressure, all at the least possible costs for the respective use. It is already obvious, however, that some of these objectives are in a conflict of objectives with one another, which makes it difficult to provide an optimum stilt vehicle of the type in question here.

But aspects that are important for practical use and have effects on the efficiency and benefits relate not only to the construction of the stilt vehicle itself. What also has substantial influence on the economic use of stilt vehicles is the transportation of the same to the point of use or between two points of use. Such transfer transportation is possible at best on a trailer. A kit comprising a self-propelled two-track stilt vehicle and a trailer suitable for transporting it and having a cargo bed is known, for example, from US 2011/0073026 A1. In the said trailer, the track width can be changed to the effect that its wheels are moved laterally outward for loading and unloading the stilt vehicle. If the stilt vehicle is parked on the cargo bed of the trailer, the wheels of the trailer are shifted laterally back inward in the direction of the middle, into a position between the front and rear wheels of the stilt vehicle.

In view of the prior art depicted in the foregoing, the object underlying the present invention is to provide a kit of the type mentioned in the introduction that comprises a stilt vehicle and a trailer used to transport the same and that is characterized by particularly high practical utility with respect to diverse common applications. In particular, the kit to be provided, comprising a self-propelled two-track stilt vehicle and transport trailer is intended to be suitable for particularly economic use in the area of biological pest control on agricultural crops.

SUMMARY

The present object is achieved in accordance with the present invention by a kit comprising a self-propelled two-track stilt vehicle, especially for agricultural and forestry applications, and a trailer used to transport the stilt vehicle and having a cargo bed. This is therefore characterized by the following features, which cooperate in synergetically functional manner: The stilt vehicle comprises a running and carrying structure provided with four wheels and having a front transverse structure oriented transversely relative to the travel direction and a rear transverse structure oriented transversely relative to the travel direction. Two front stilt structures are disposed on both sides at the end of the front transverse structure and two rear stilt structures are disposed on both sides at the end of the rear transverse structure. Wheel-carrying units that carry respectively at least one wheel are disposed on the stilt structures. The front and rear transverse structures are respectively constructed in multiple parts having a middle piece and a left and right end piece, which can be fixed thereon in various width positions and to which the respective associated stilt structure is connected. The stilt structures are respectively constructed in multiple parts having a primary part connected to the associated end piece of the transverse structure in question and a secondary part, which can be fixed thereon in various height positions and on which the associated wheel-carrying unit is disposed. No positioning drives are provided that bring about a change of position of the secondary parts and primary parts of the stilt structures of the stilt vehicle relative to one another. A lifting device, braced on the trailer, is provided that acts on central elements of the running and carrying structure of the stilt vehicle.

One of the features of particular importance that characterizes the running and carrying structure of the stilt vehicle consists accordingly in the specific construction of a front and rear transverse structure respectively oriented transversely relative to the travel direction in such a way that they are respectively constructed in multiple parts having a middle piece and two end pieces, which can be fixed thereon in various width positions and to which a respective associated stilt structure is connected. The change of the track width that is possible in this way with little complexity (see below) permits a stilt vehicle, which for its safe use on sloping terrain—in "operating mode"—to have a large track width spanning several rows of plants if necessary, and for its transportation to and from the point of use—in "transfer mode"—to be adjusted to such a small track width that transportation may be achieved by means of a normal roadworthy trailer that is not subject to any kind of special regulations—or with any other vehicle having a comparable cargo situation. For the costs associated with the respective use, this is an invaluable advantage, since any special transportation requiring a permit for overwidth incurs considerable costs (e.g. for escort vehicles, etc.), and in addition the flexibility of use suffers from the need for a permit. Conversely, by virtue of the said positionability, a multi-track stilt vehicle capable of being transported easily by almost any means can be adjusted with little effort to such a (large) track width for use that (even in the case of very lightweight construction; see below) such a high tilting stability is assured that a possible driver's cab may be disposed at a level above the transverse structures. This is a decisive advantage with respect to giving the operator a good overview of the crop or other area during use.

Furthermore, by the fact that the stilt structures are constructed in multiple parts having a primary part connected to the associated end piece of the transverse structure in question and a secondary part, which can be fixed thereon in various height positions and on which the associated wheel-carrying unit is disposed, the height of the stilt vehicle may also be changed with little effort. In particular, the overall height of the stilt vehicle may be lowered, so that it can be loaded on a trailer or the like for its transportation on public highways. Likewise, the height of the transverse structures above the ground to be traversed may be adapted to the respective requirements, taking into consideration the height of the plants to be traveled over. Thus especially the transverse structures can be adjusted to the lowest height necessary for travel over the plants, so that the center of gravity of the stilt vehicle is not higher than is absolutely necessary for the respective use. This is favorable with respect to optimum tilting stability. This absence of positioning drives, which bring about a change of position of the secondary parts and primary parts of the stilt structures of the stilt vehicle relative to one another—and thus a positioning of the height of the transverse structures above the ground—favors a particularly light weight of the stilt vehicle and thus a ground-protecting low ground pressure and also low manufacturing costs.

By exploiting the construction of the stilt vehicle and of the trailer used to transport it, as depicted and explained in the foregoing, loading of the stilt vehicle onto the trailer can be handled in particularly preferred manner as follows: The stilt vehicle—adjusted from its use in "operating mode" to large track width (working track width) and large ground clearance (working height)—travels over the trailer, so that the cargo bed thereof is situated between the two tracks of the stilt vehicle. (Alternatively, the trailer travels correspondingly in kinematically opposite manner under the stilt vehicle adjusted to large track width and large round clearance.) By means of the lifting device, which is braced on the trailer and which, for example, acts on longitudinal beams (see below) of the running and carrying structure of the stilt vehicle or other central elements of its running and carrying structure, the stilt vehicle is then supported, so that the wheels are unburdened or even raised somewhat from the ground. After the fixation of the primary and of the secondary parts relative to one another has then been released in the stilt structures, the stilt structures are adjusted in order to shorten their length, wherein the primary and secondary parts are shifted relative to one another for this purpose. For this purpose—in the absence of height-positioning drive inherent to the vehicle—the region of the running and carrying structure of the stilt vehicle braced by the lifting device associated with the trailer is gradually lowered by means of the lifting device, until the relative position of the primary and secondary parts relative to one another corresponds to the transfer mode. In this position, the primary and secondary parts of the stilt structures are then fixed once again. Thereafter the stilt vehicle is brought by means of the lifting device to such a height that its wheels are located at a level situated above the level of the cargo bed.

Then—after the corresponding fixation has been released—the end pieces of the front and rear transverse structure are positioned so far inwardly, toward the vehicle middle of the stilt vehicle, that its wheels are situated above the cargo bed of the trailer. Then the stilt vehicle, which is therefore now situated—with respect to height and width—in its "transfer mode", is lowered by means of the lifting device until it stands upright, with its wheels on the cargo bed of the trailer. For the ensuing transportation journey to a further point of use, the stilt vehicle is secured in accordance with the applicable regulations. Unloading of the stilt vehicle from the trailer takes place logically in reversed sequence compared with the loading described in the foregoing.

Before the stilt vehicle can be lowered onto the trailer—in an appropriately preferred configuration of the trailer—a "fine adjustment" of the orientation of the stilt vehicle relative to the trailer may still be made. Thus a shift-compensating arrangement in particular may be provided, which permits lateral shifting of the raised stilt vehicle relative to the trailer. In this sense, for example, the at least one scissors lift—or other lifting arrangement—may be mounted on a sled, which can be shifted laterally toward the left and right on associated rails on the loading-platform side. And, furthermore, a rotation-compensating arrangement may be provided alternatively or additionally, which permits rotation, around a vertical axis, of the raised stilt vehicle relative to the trailer. For realization of such a rotation-compensating arrangement, a carrying plate, for example, which supports the chassis of the stilt vehicle, may be constructed in the manner of a turntable.

The said lifting device used during loading and unloading (e.g. in the form of several hydraulically driven scissor lifts) may be a fixed, integral component of the correspondingly equipped trailer that is matched specifically to the individual stilt vehicle.

According to a first preferred further development of the invention, the end pieces and the middle pieces of the transverse structures as well as the secondary parts and the primary parts of the stilt structures can be fixed to one another by means of clamped connections. In an appropriate construction, infinitely variable positionability in particular may be realized by means of such clamped connections. In the case of use of profile pipes for the end pieces and the middle pieces of the transverse structures and/or the secondary parts and the primary parts of the stilt structures, and of the deployment of such clamped connections, in which the profile pipes in question are embraced by respectively at least one tensioning bracket, another significant advantage of clamped connections acting (purely frictionally) between the respective components is that the profile pipes can avoid engagements that cause weakening. Thus the profile pipes may be constructed in correspondingly statically optimized manner, which favors the objective of the lightest possible weight of the stilt vehicle. Nevertheless, in addition to a purely frictional clamped connection in the foregoing sense, it is also possible to provide, if necessary, an interlocking fixation by means of bolts, pins, catches or the like that is preadjusted to certain definite positions of the end pieces and middle pieces of the transverse structures and/or of the secondary parts and primary parts of the stilt structures relative to one another. These include clamped connections having clamping or tensioning bolts, which pass transversely through the profile pipes to be clamped with one another. Such interlocking fixations unburden a purely frictional clamped connection that may be provided and contributes to increased safety. Catch connections that automatically snap into place (especially on the stilt structures) additionally act in the sense of increased operating comfort during changeover of the stilt vehicle from operating mode to transfer mode (and vice versa).

According to another preferred further development of the invention, likewise in the sense of the objective of the lightest possible weight, the middle pieces of the transverse structures are constructed in the manner of frames, with two transverse spars, which are joined to one another via longitudinal spars. This leads to favorable statics with the least possible structural complexity and is accompanied by minimum use of material. Particularly preferably, the said transverse spars of the transverse structures and their end pieces are formed from profile pipes having matching profile cross section.

In corresponding manner, the secondary parts of the stilt structures are preferably constructed in the manner of frames having two vertical spars, which are joined to one another via horizontal spars. In turn, the said vertical spars of the stilt structures and their primary parts of profile pipes are formed having matching profile cross section.

According to yet another preferred further development of the invention, the middle pieces explained hereinabove of the two transverse structures are joined to one another via longitudinal beams. These may be in particular part of a main frame and be joined to one another via transverse beams. In particular, in a preferred further development of the invention, a driver's cab may be mounted on the corresponding main frame and/or a working mechanism, for example a spreading mechanism for spreading pest-control agents, may be mounted thereon. The said transverse beams of the main frame and transverse spars of the transverse structures may again be formed from profile pipes having matching profile cross section, wherein respectively one transverse beam of the main frame is joined to a transverse spar of the transverse structure in question. As a result, therefore, the carrying structure may be constructed on the whole in the manner of a scaffold substantially comprising solely profile elements joined together (especially by means of clamped connections), namely portions of profile pipes with identical cross-sectional profile.

Light metal, namely a metal or alloy having a density below 5.0 g/cm³, is particularly suitable for the manufacture of the various profile elements explained in the foregoing. In the case of use of aluminum or of another light metal, optimization may be achieved in terms of weight (and thus ground pressure), standardization potential, constructive complexity and costs (development, manufacturing and operating costs). Thus a particularly preferred further development of the invention is characterized in that the transverse structures and the stilt structures as well as a main frame that may be provided are constructed from light-metal profile elements.

A contribution to increased operating comfort of the stilt vehicle is achieved when positioning drives (such as hydraulic cylinders, for example, or especially electrical spindle drives or electrical linear drives as the case may be) are provided, by means of which a change of position of the end pieces and of the middle pieces of the transverse structures relative to one another may be achieved. In this connection, under the aspect of lighter weight, purely electrical positioning drives are to be preferred over electrohydraulic positioning drives. In the interests of a quite particularly light weight and thus a particularly low ground pressure, however, it is also possible, in the stilt vehicle, to do without such positioning drives that bring about a change of position of the end pieces and middle pieces of the transverse structures relative to one another. In this case, positioning of the transverse structures with respect to the track width—when the wheels are raised from the ground—takes place manually or if necessary with the aid of external appliances (e.g. battery-powered screwdriver for driving a positioning spindle).

Another preferred further development of the inventive stilt vehicle is characterized in that two driven and two steerable wheels are provided. Particularly preferably in this connection, an electrical steering mechanism may be integrated into the wheel-carrying unit in question for the steerable wheels and/or an electrical drive motor may be integrated into the wheel-carrying unit in question for the driven wheels. Several construction variants are conceivable for the said drive motors, for example wheel-hub motors, upright motors with bevel-gear deflection, horizontal motors with chain transmission, etc. Since in this way, i.e. because the propulsion or steering functionality associated with the wheel in question is restricted to the wheel-carrying unit due to the integration of the steering mechanism or of the drive motor into the wheel-carrying unit, the front and the rear stilt structures may be constructed identically. This is also a viewpoint of cost minimization.

Although a driver's cab has been mentioned on various occasions in the foregoing, this is not to be interpreted to the effect that the inventive stilt vehicle is necessarily to be operated by a vehicle driver riding along. To the contrary, inventive stilt vehicles may also be propelled autonomously or else under remote control of an external operator.

BRIEF DESCRIPTION OF THE DRAWING

The present invention will be explained in more detail hereinafter on the basis of a preferred exemplary embodiment illustrated in the drawing, wherein.

DETAILED DESCRIPTION OF THE PREFERRED EMBODIMENTS

Figure 1:
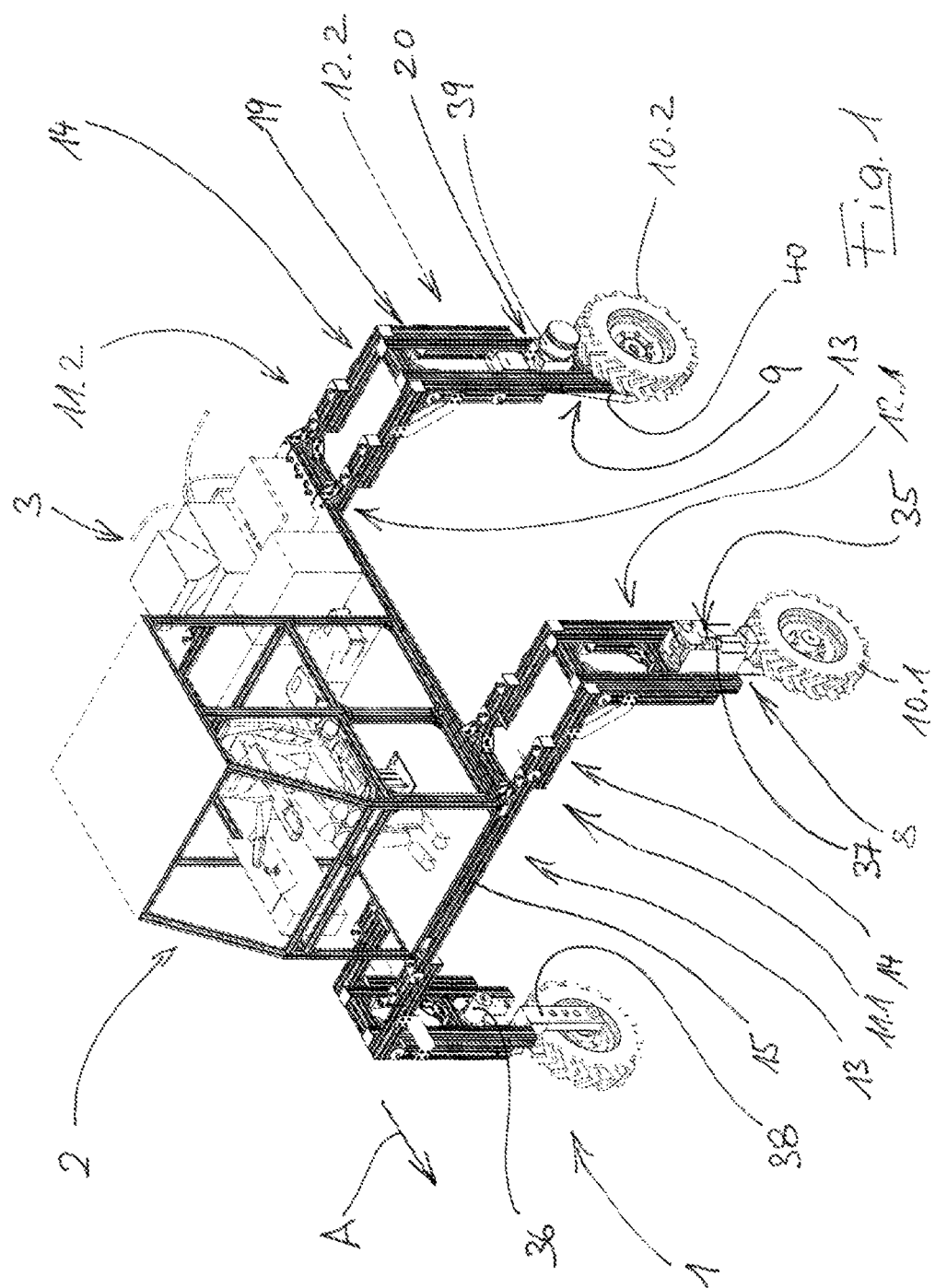
FIG. 1 shows a self-propelled two-track stilt vehicle in operating mode.

The self-propelled two-track stilt vehicle shown in the drawing and designed, suitable and constructed for agricultural, horticultural and forestry applications comprises a running and carrying structure 1 and superstructures attached thereon in the form of a driver's cab 2 and a working mechanism 3. The latter is constructed as a spreading mechanism 4 for spreading pest-control agents. The said running and carrying structure 1 comprises a region 5 constructed in the manner of a scaffold—joined together from profile elements—and four wheel units 6, 7 disposed thereon with respectively a wheel-carrying unit 8, 9 and a wheel 10.1 and 10.2 disposed thereon.

Running and carrying structure 1, specifically its region 5 constructed in the manner of a scaffold joined together from profile elements, comprises a front transverse structure 11.1 oriented transversely relative to travel direction A and a rear transverse structure 11.2 likewise oriented transversely relative to travel direction A as well as two front stilt structures 12.1—joined on both sides to front transverse structure 11.1 and two rear stilt structures 12.2—joined on both sides to rear transverse structure 11.2. Both front and rear transverse structures 11.1 and 11.2 are respectively constructed in several parts; they comprise respectively a middle piece 13 as well as left and right end pieces 14. The said middle piece 13 of transverse structures 11.1 and 11.2 are constructed in the manner of frames; they consist substantially of respectively two transverse spars 15, which are joined to one another via longitudinal spars 16. Longitudinal spars 16 are disposed between the two transverse spars 15 (in the same plane as these) in such a way that the transverse spars 15 project laterally beyond longitudinal spars 16.

Figure 2:
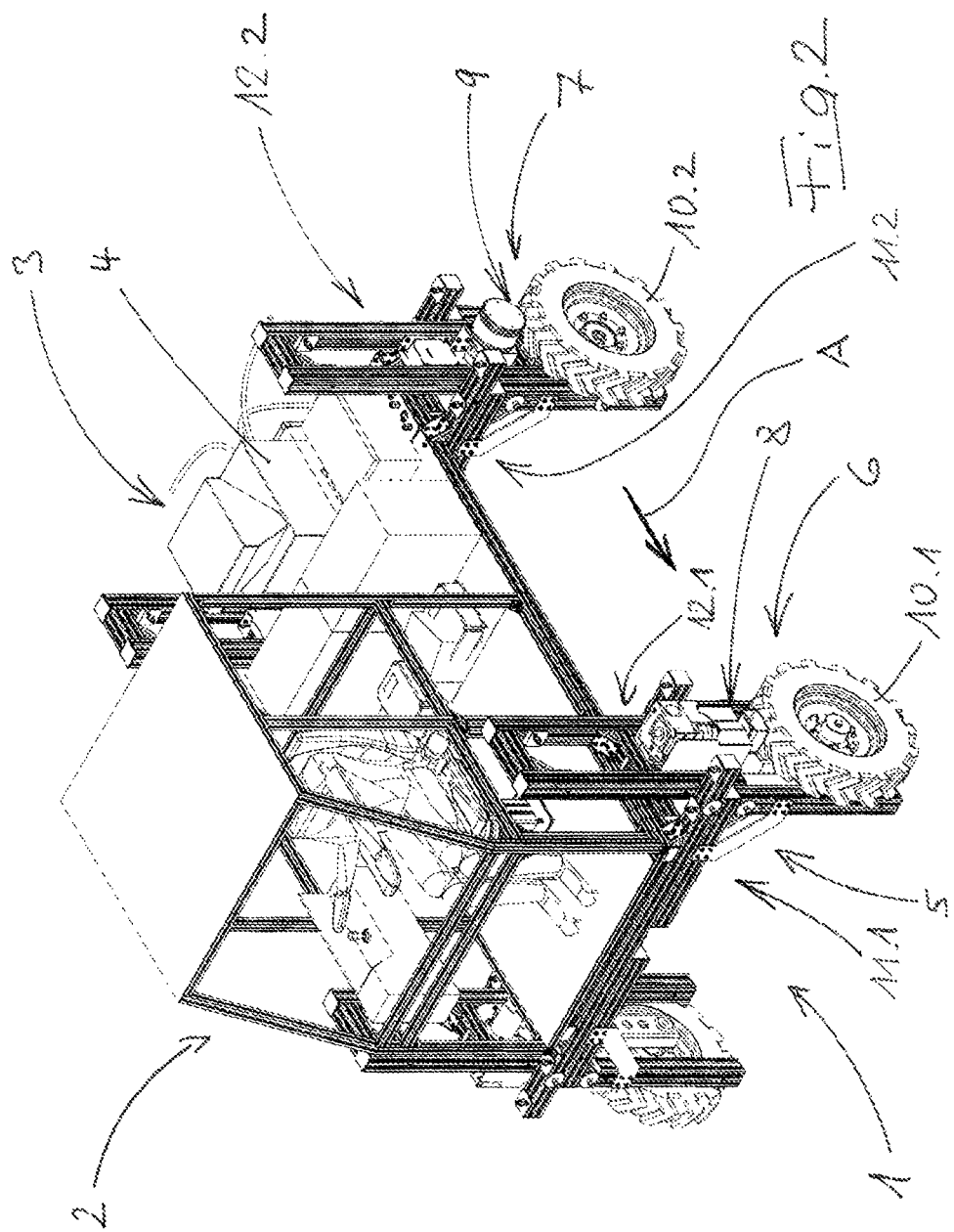
FIG. 2 shows the self-propelled two-track stilt vehicle according to FIG. 1 in transfer mode.
Figure 3:
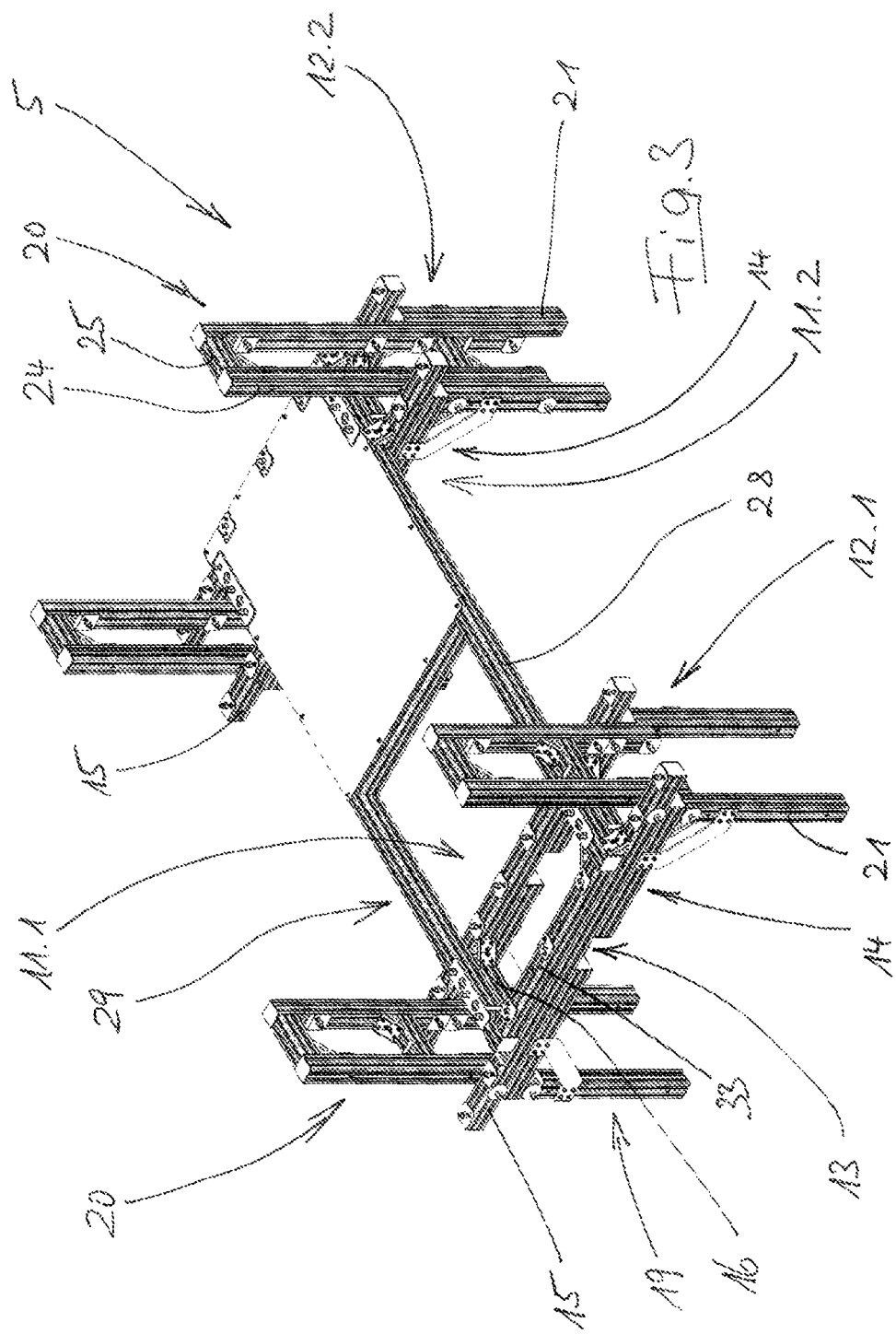
FIG. 3 shows the region of the carrying and running structure, constructed in the manner of a scaffold of profile elements, of the self-propelled two-track stilt vehicle according to FIGS. 1 and 2 in transfer mode.
Figure 4:
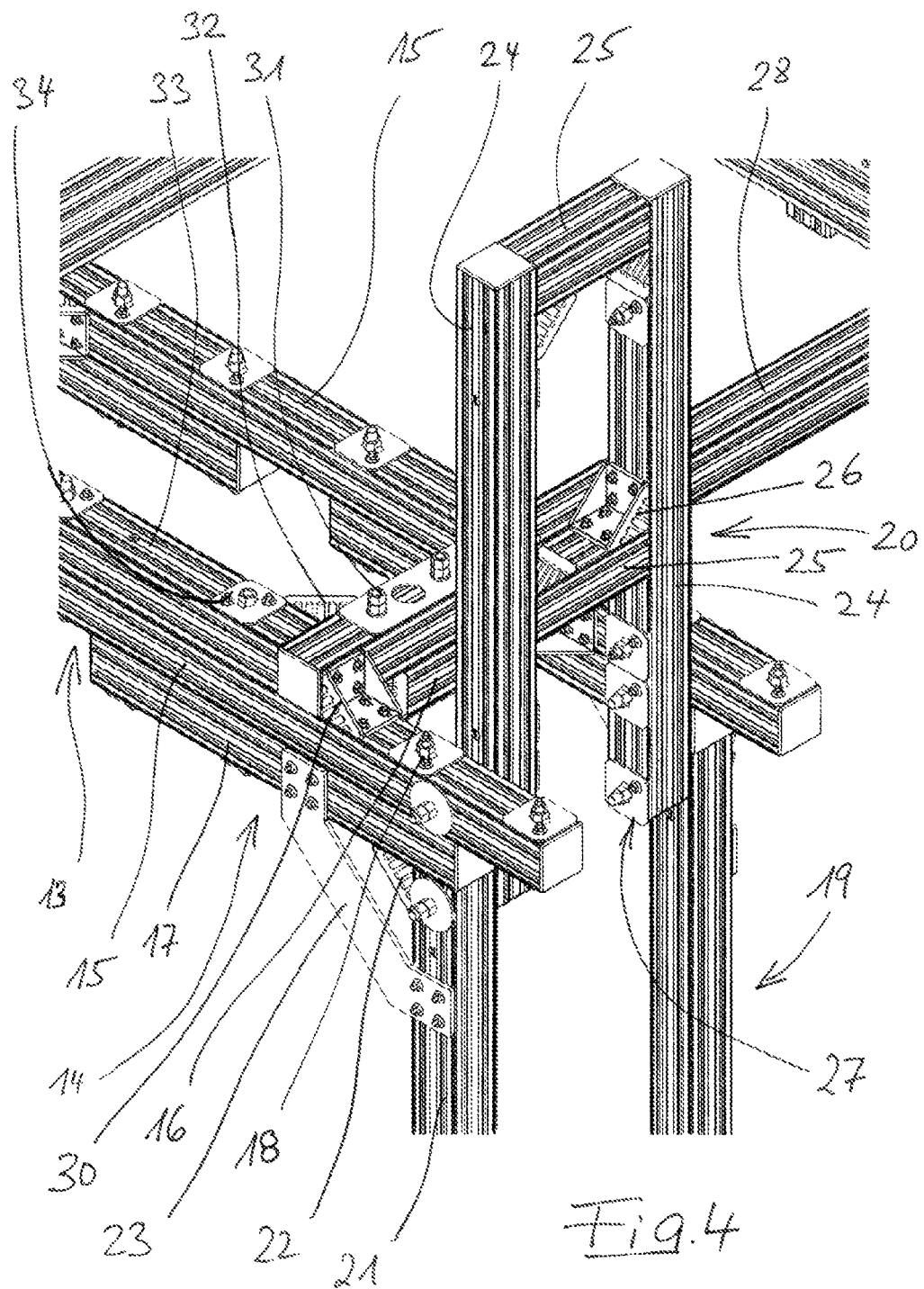
FIG. 4 shows a detail, namely the left front corner region, of the scaffold-like region, shown in FIG. 3, of the carrying and running structure of the self-propelled two-track stilt vehicle according to FIGS. 1 and 2, and FIGS. 5A-5G show the loading of the stilt vehicle onto the associated transport trailer in several illustrated steps.

Underneath each transverse spar 15, an end piece 14 of the respective transverse structure 11.1 and 11.2 is disposed that is formed by a profile portion 17. The respective end piece 14 may occupy various positions relative to the associated transverse spar 15 of middle piece 13 in question, namely especially a maximally extended position (FIG. 1), a maximally retracted position (FIG. 2) and any intermediate positions. By means of clamping devices 18 disposed in the regions of the projections of transverse spars 15, respectively end piece 14 can be fixed on the transverse spar 15 of middle piece 13.

The four stilt structures 12.1 and 12.2 are also respectively constructed in multiple parts. They comprise respectively a primary part 19 connected to the associated end piece 14 of the transverse structures 11.1 and 11.2 in question and a secondary part 20, which can be fixed thereon in various height positions. The said primary part 19 of stilt structures 12.1 and 12.2 is respectively formed by two vertical profile portions 21, which are joined rigidly to end pieces 14 of transverse structures 11.1 and 11.2. To establish strong and stiff structures, the said respective connection regions are stiffened by angle fillers 22 as well as by connecting plates 23. Secondary parts 20 of stilt structures 12.1 and 12.2 are constructed in the manner of frames having—disposed between profile portions 21 forming the respective primary part 19—two vertical spars 24, which are joined rigidly to one another via two horizontal spars 25 (disposed between them). The said frame-like secondary parts 20 are stiffened by angle fillers 26 in the four corner regions defined between vertical spars 24 and horizontal spars 25. Secondary part 20 of stilt structures 12.1 and 12.2 can be disposed respectively at different heights relative to primary part 19, especially in a maximally extended position (FIG. 1) and a maximally retracted position (FIG. 2) as well as any intermediate position and fixed there by means of clamping devices 27 acting between the profile portions 21 forming primary part 19 and vertical spars 24 of secondary parts 20. A wheel-carrying unit 8 or 9 is attached to each of the secondary parts 20 of stilt structures 12.1 and 12.2 in the lower region.

Carrying and running structure 1 further has a main frame 29 comprising two longitudinal beams 28, to which middle pieces 13 of the two transverse structures 11.1 and 11.2 are attached. For this purpose, longitudinal beams 28 of main frame 29 are joined—via angle fillers 30—to transverse spars 15 of middle pieces 13 of transverse structures 11.1 and 11.2 as well as—by means of clamped connections 31—to longitudinal spars 16, in contact with them from underneath, of middle pieces 13 of transverse structures 11.1 and 11.2. Main frame 29 further comprises several transverse beams 33 extending between the two longitudinal beams 28 and—via angle fillers 32—joined thereto. The said front transverse beam 33 of main frame 29 is joined via clamping devices 34 to front transverse spar 15 of middle piece 13 of front transverse structure 11.1.

All profile portions explained in the foregoing and from which transverse structures 11.1 and 11.2, stilt structures 12.1 and 12.2 and main frame 29 are composed have matching profile cross sections. They are portions of an extruded aluminum profile with substantially square-shaped basic cross section having respectively two T-shaped clamping slots on all four faces. For typical application situations of a manned stilt vehicle having a built-on mechanism of average weight, a profile having a square-shaped basic cross section with 9 cm edge length is favorable.

The stilt vehicle is equipped with two driven, non-steerable rear wheels 10.2 and two steerable, non-driven front wheels 10.1. Accordingly, an electrical steering mechanism 35 is integrated in each of the two front wheel-carrying units 8, which are connected to secondary part 20 of the associated stilt structure 12.1. This comprises respectively a steering motor 36 and a steering transmission 37, the output shaft of which can be pivoted around a vertical axis. One branch of angle piece 38, on the other branch of which the respective front wheel 10.1 is pivotally mounted, is securely joined thereto.

In order—for autonomous propulsion of the stilt vehicle—to drive the rear wheels 10.2, electrical drive motors 39 are integrated in rear wheel-carrying units 9—which are connected to secondary parts 20 of the two rear stilt structures 12.2. These are disposed above rear wheels 10.2. The respective train comprises a height-displacement transmission 40.

For problem-free transportation of the stilt vehicle in transfer mode, the minimum width overall preferably does not exceed 2.15 m and particularly preferably is between 2.05 m and 2.15 m, especially approximately 2.12 m. The width of main frame 29 is preferably approximately between 1.1 m and 1.25 m, particularly preferably between 1.15 m and 1.2 m, especially approximately 1.18 m. In typical application situations, transverse spars 15 of middle pieces 13 of transverse structures 11.1 and 11.2 preferably project, in transfer mode, approximately 15 cm to 20 cm, particularly preferably approximately 18 cm to 19 cm, especially approximately 18.5 cm beyond the maximally retracted end pieces 14 of the transverse structures. In these cases, the outside edges of wheel-carrying units 8, 9 (together with steering mechanism 35 and drive motors 39) and wheels 10.1 and 10.2 are able to sit approximately flush with the ends of transverse structures 11.1 and 11.2, so that the space is optimally exploited.

Figure 5B:
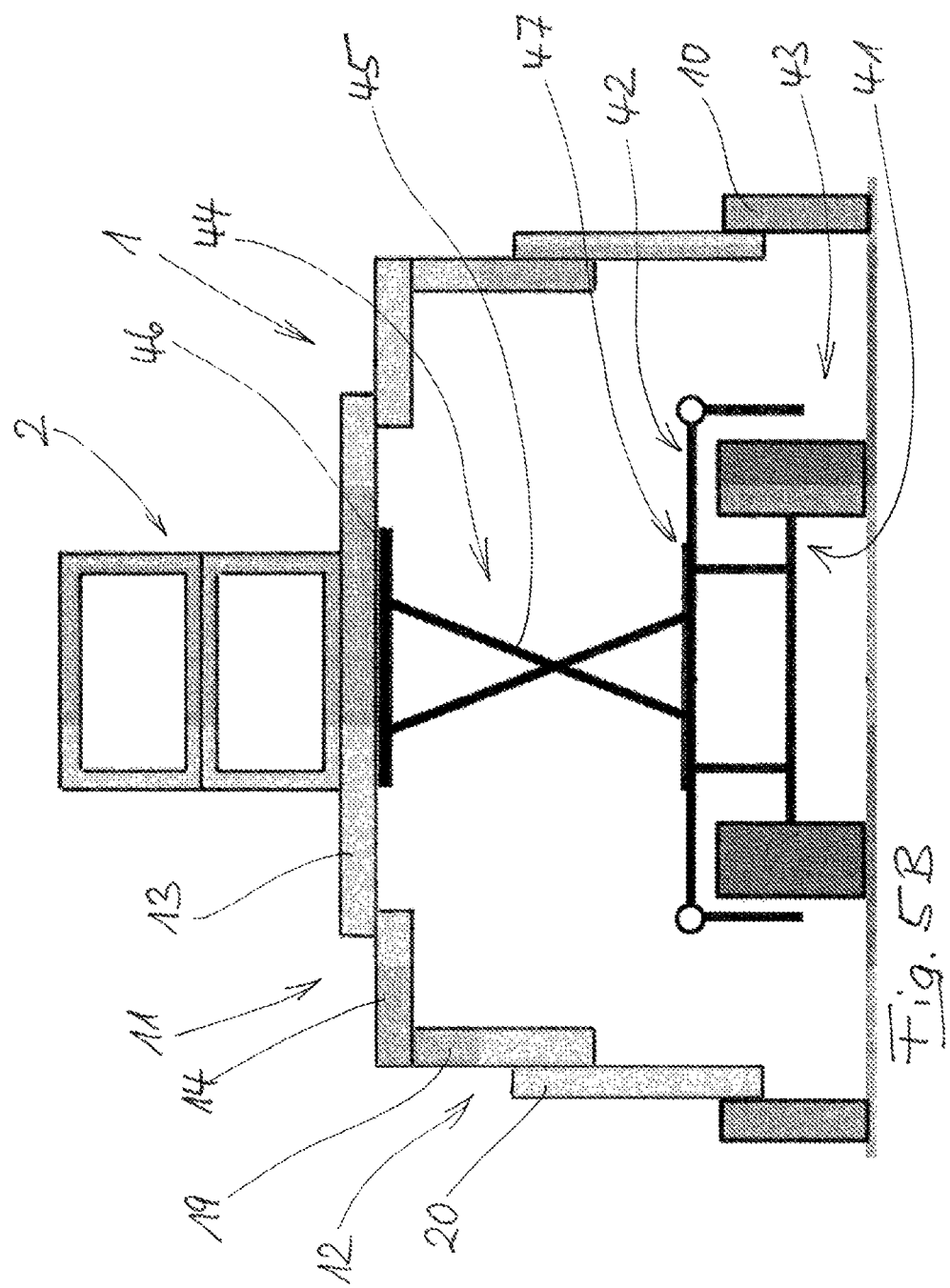

The loading process that takes place at the point of use—after use of the stilt vehicle explained in detail in the foregoing has been completed—on the associated trailer 43 provided with a cargo bed 42 braced on a chassis 41, in order to transfer the stilt vehicle, may be configured as follows, as is illustrated schematically in the diagrams of FIGS. 5A-5G:

The stilt vehicle—adjusted from its use in "operating mode" to large track width (working track width) and large ground clearance (working height)—travels over trailer 43, so that cargo bed 42 thereof is situated between the two tracks of the stilt vehicle (FIG. 5A). (Alternatively, trailer 43 may be pushed/driven under the upright stilt vehicle.) Lifting device 44, which is associated with trailer 43 and braced thereon, and which may comprise, for example a hydraulic scissors lift 45 according to the sketch, is then urged upward until its upper carrying plate 46 reaches running and carrying structure 1 of the stilt vehicle, for example, the longitudinal beam 28 thereof (see above) and—with continued lifting movement of lifting device 44—supports the stilt vehicle so strongly or lifts it so far that wheels 10 are unburdened (FIG. 5B) or even raised somewhat from ground B. Now the fixation of the primary and secondary parts 19, 20 relative to one another is released—by loosening clamping devices 27 (see above)—in stilt structures 12, so that primary and secondary parts 19, 20 can be shifted relative to one another. To shorten the length of stilt structures 12, lifting device 44 is retracted, i.e. the region of running and carrying structure 1 of the stilt vehicle braced by lifting device 44 is progressively lowered by means of lifting device 44. This continues until the relative position of primary and secondary parts 19, 20 of stilt structures 12 relative to one another corresponds to the transfer mode, in which stilt structures 12 typically have their minimum length (FIG. 5C). In this position, primary and secondary parts 19, 20 of stilt structures 12 are then—by tightening clamping devices 27—fixed relative to one another once again.

Figure 5E:
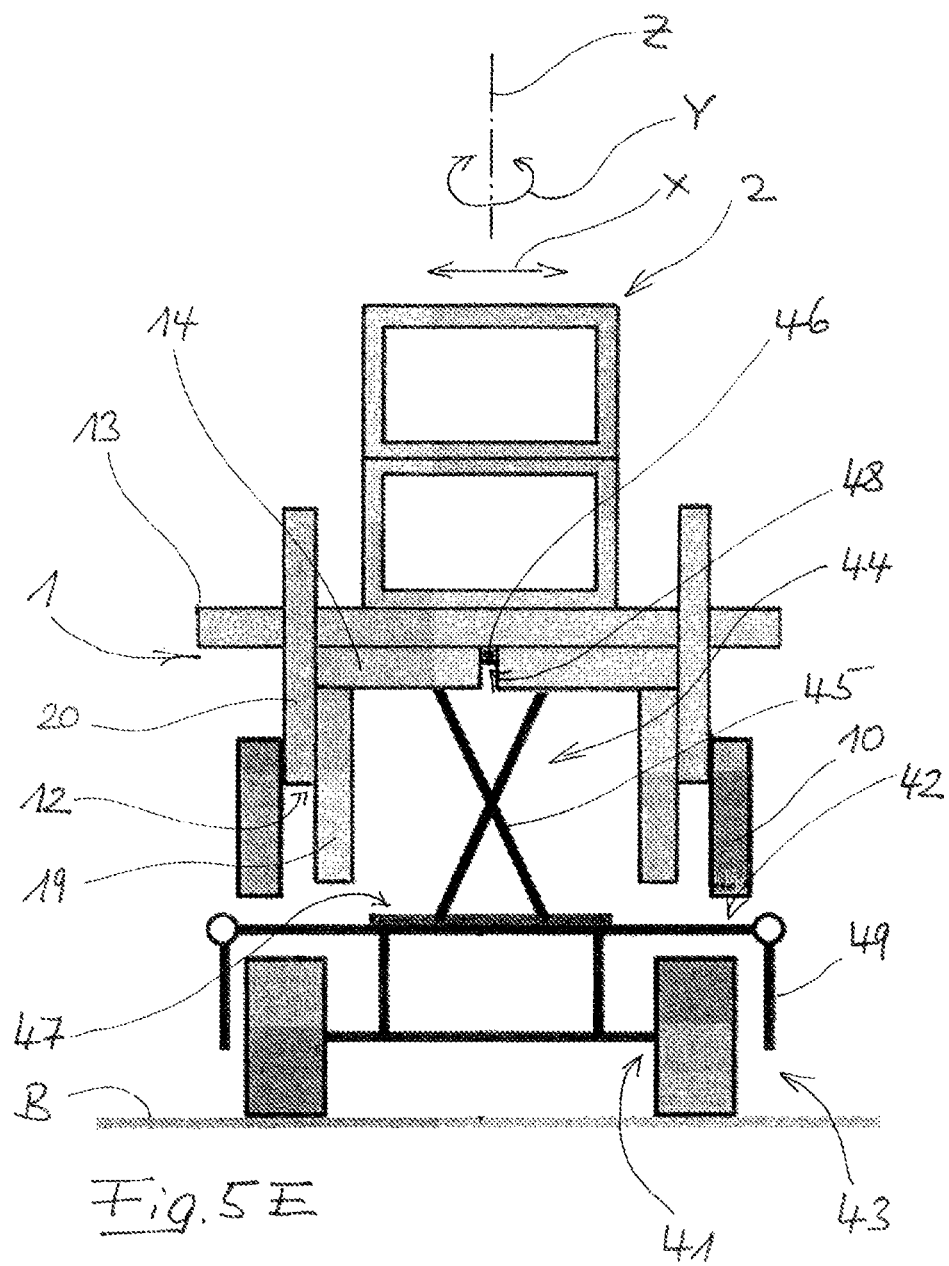

Thereafter the stilt vehicle is brought by means of lifting device 44 to such a height that wheels 10 are located at a level situated above the level of cargo bed 42 of trailer 43 (FIG. 5D). Then—after the corresponding fixation has been released—end pieces 14 of the front and rear transverse structure 11 are positioned so far inwardly, toward the vehicle middle of the stilt vehicle, that its wheels 10 are situated above cargo bed 42 of trailer 43 (FIG. 5E). If lifting device 44 is provided with compensating arrangements 47, 48 that—within narrow predetermined limits—permit lateral shifting (double arrow X) of the raised stilt vehicle and/or rotation (double arrow Y) of the stilt vehicle around a vertical axis Z, the stilt vehicle can now be positioned in its transfer mode exactly relative to cargo bed 42 of trailer 43.

Figure 5F:
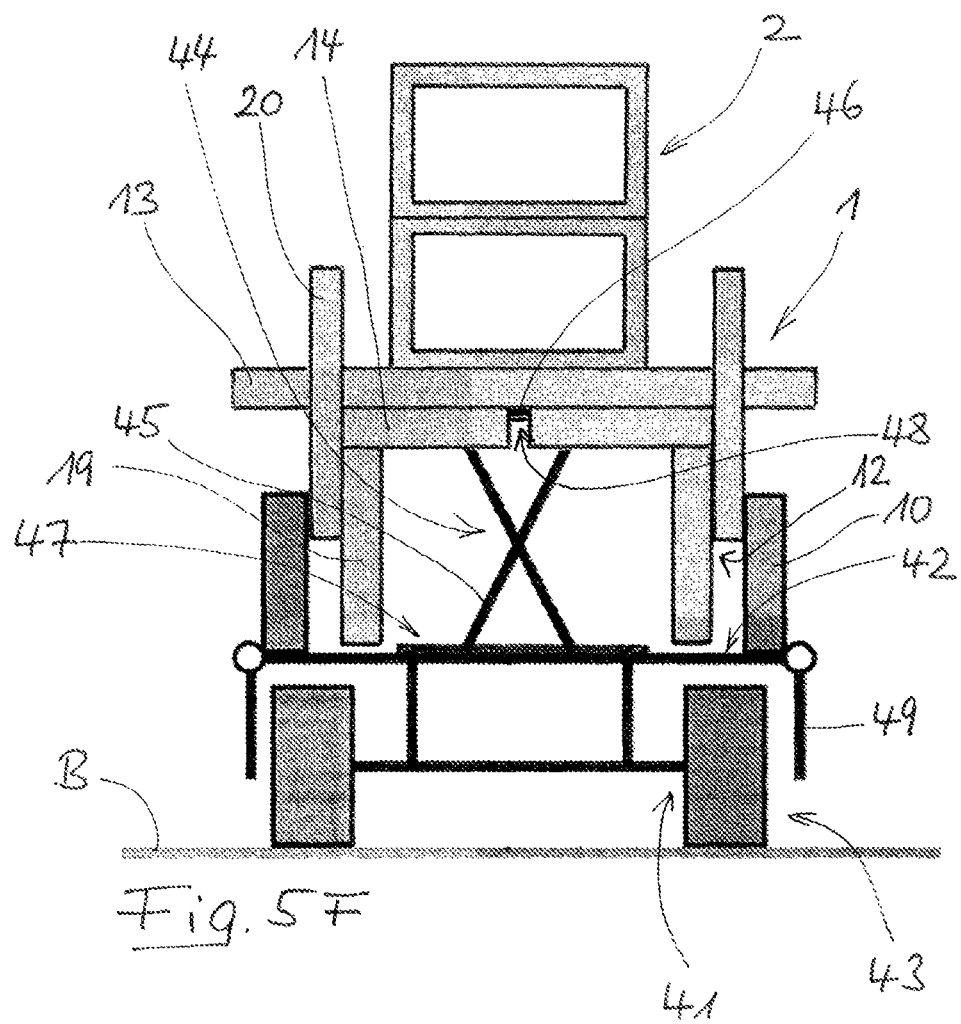
Figure 5G:
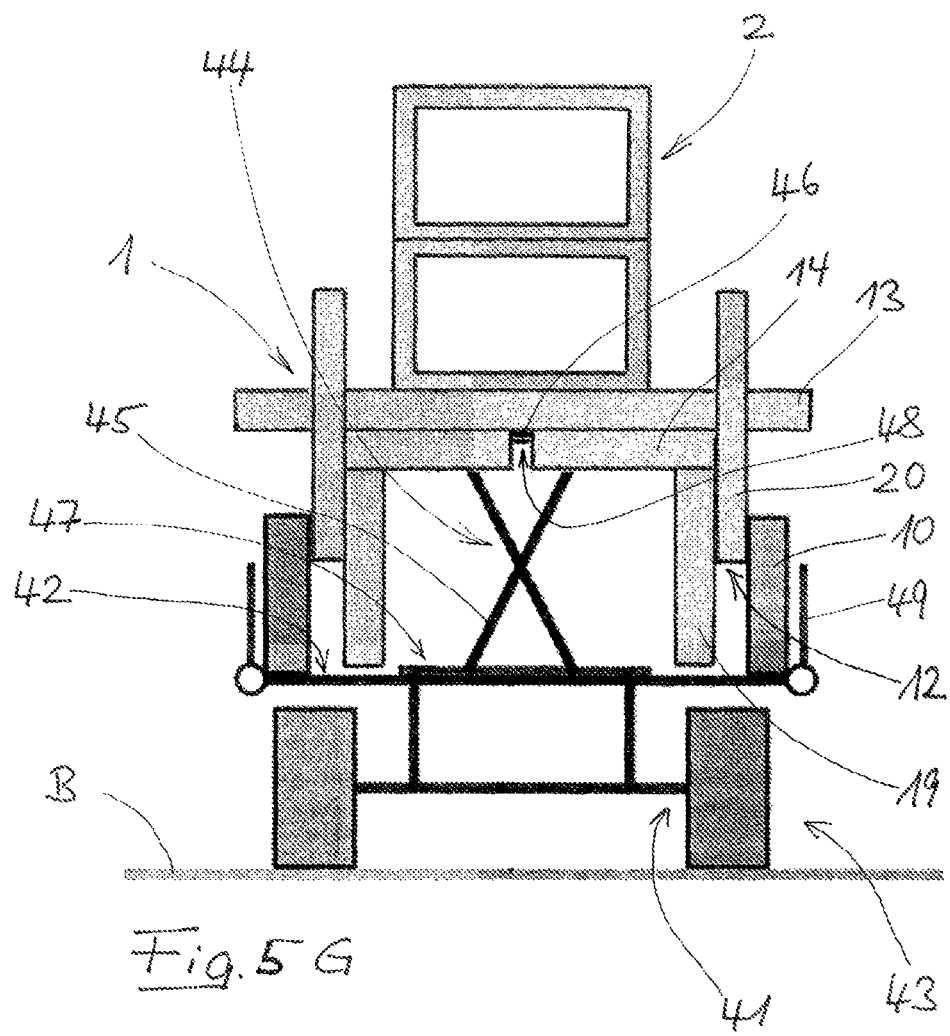

Finally, the stilt vehicle, which is therefore now situated—with respect to height and width—in its "transfer mode", is lowered by means of lifting device 44 until it stands upright, with its wheels 10 on cargo bed 42 of trailer 43 (FIG. 5F). For the ensuing transportation journey for transfer to a further point of use, the stilt vehicle is secured in accordance with the applicable legal regulations. In an appropriate construction of trailer 43, this also includes folding up (or moving upward) of trailer side parts 49 that may be present (see FIG. 5G).

Unloading of the stilt vehicle from trailer 43 takes place logically in reversed sequence compared with the loading described in the foregoing.

What is claimed is:

1. A kit, comprising a self-propelled two-track stilt vehicle and a trailer (43) used to transport the stilt vehicle and having a cargo bed (42), wherein:
    the stilt vehicle comprises a running and carrying structure (1) provided with four wheels (10.1, 10.2) and having a front transverse structure (11.1) oriented transversely relative to the travel direction (A) and a rear transverse structure (11.2) oriented transversely relative to the travel direction;
    two front stilt structures (12.1) are disposed on opposite sides at ends of the front transverse structure (11.1) and two rear stilt structures (12.2) are disposed on opposite sides at ends of the rear transverse structure (11.2);
    four wheel-carrying units (8, 9) that each carry respectively at least one wheel (10.1, 10.2) are disposed on the stilt structures (12.1, 12.2);
    the front and rear transverse structures (11.1, 11.2) are respectively constructed in multiple parts having a middle piece (13) and a left and right end piece (14), which can be fixed thereon in various width positions and to which the respective associated stilt structure (12.1, 12.2) is connected;
    the stilt structures (12.1, 12.2) are respectively constructed in multiple parts having a primary part (19) connected to the associated end piece (14) of the transverse structure (11.1, 11.2) in question and a secondary part, which can be fixed thereon in various height positions and on which the associated wheel-carrying unit (8, 9) is disposed;
    no positioning drives are provided that bring about a change of position of the secondary parts (20) and of the primary parts (19) of the stilt structures (12.1, 12.2) of the stilt vehicle relative to one another;
    a lifting device (44), braced on the trailer (43), is provided that acts on central elements of the running and carrying structure (1) of the stilt vehicle, the central elements not being disposed on the wheel carrying units,
    wherein, in the stilt vehicle, the transverse structures (11.1, 11.2) and the stilt structures (12.1, 12.2) as well as a main frame (29) are constructed from aluminum profile elements.

2. The kit of claim 1, wherein, in the stilt vehicle, the end pieces (14) and the middle pieces (13) of the transverse structures (11.1, 11.2) as well as the secondary parts (20) and the primary parts (19) of the stilt structures (12.1, 12.2) can be fixed to one another by means of clamped connections (18, 27).

3. The kit of claim 1, wherein, in the stilt vehicle, the middle pieces (13) of the transverse structures (11.1, 11.2) are constructed in the manner of frames with two transverse spars (15), which are joined to one another via longitudinal spars (16).

4. The kit of claim 3, wherein the transverse spars (15) of the transverse structures (11.1, 11.2) and their end pieces (14) are formed from standard elements having matching profile cross section.

5. The kit of claim 3, wherein the transverse beams (33) of the main frame (29) and transverse spars (15) of the transverse structures (11.1, 11.2) are formed from standard elements having matching profile cross section, wherein respectively one transverse beam (33) of the main frame (29) is joined to a transverse spar (15) of the transverse structure (11.1, 11.2) in question.

6. The kit of claim 1, wherein, in the stilt vehicle, the secondary parts (20) of the stilt structures (12.1, 12.2) are constructed in the manner of frames having two vertical spars (24), which are joined to one another via horizontal spars (25).

7. The kit of claim 6, wherein the vertical spars (24) of the secondary parts (20) of the stilt structures (12.1, 12.2) and their primary parts (19) are formed from standard elements having matching profile cross section.

8. The kit of claim 1, wherein, in the stilt vehicle, the middle pieces (13) of the two transverse structures (11.1, 11.2) are joined to one another via longitudinal beams (28).

9. The kit of claim 8, wherein the longitudinal beams (28) are part of a main frame (29) and are joined to one another via transverse beams (33).

10. The kit of claim 1, wherein, in the stilt vehicle, two driven wheels (10.2) and two steerable wheels (10.1) are provided.

11. The kit of claim 10, wherein an electrical steering mechanism (35) is integrated in the wheel-carrying units (8) in question of the steerable wheels (10.1).

12. The kit of claim 10, wherein an electrical drive motor (39) is integrated in the wheel-carrying unit (9) in question of the driven wheels (10.2).

13. The kit of claim 1, wherein, in the stilt vehicle, no kind of positioning drives are provided that cause a change of position of the end pieces (14) and the middle pieces (13) of the transverse structures (11.1, 11.2) relative to one another.

14. The kit of claim 1, wherein the lifting device (44) is a fixed, integral component of the trailer (43).

15. The kit of claim 1, wherein, in the stilt vehicle, a driver's cab (2) is constructed on a main frame (29).

16. The kit of claim 1, wherein, in the stilt vehicle, a working mechanism (3) is constructed on a main frame (29).

17. The kit of claim 16, wherein the working mechanism (3) is a spreading mechanism (4) for spreading pest-control agents.

18. The kit of claim 1, wherein a rotation-compensating arrangement (48) that permits rotation (Y), around a vertical axis (Z), of the raised stilt vehicle relative to the trailer (43), is associated with the lifting device (44).

19. The kit of claim 1, wherein a shift-compensating arrangement (47) that permits lateral shifting (X), of the raised stilt vehicle relative to the trailer (43) is associated with the lifting device (44).

20. A kit, comprising a self-propelled two-track stilt vehicle and a trailer (43) used to transport the stilt vehicle and having a cargo bed (42), wherein:
    the stilt vehicle comprises a running and carrying structure (1) provided with four wheels (10.1, 10.2) and having a front transverse structure (11.1) oriented transversely relative to the travel direction (A) and a rear transverse structure (11.2) oriented transversely relative to the travel direction;
    two front stilt structures (12.1) are disposed on opposite sides at ends of the front transverse structure (11.1) and two rear stilt structures (12.2) are disposed on opposite sides at ends of the rear transverse structure (11.2);
    four wheel-carrying units (8, 9) that each carry respectively at least one wheel (10.1, 10.2) are disposed on the stilt structures (12.1, 12.2);
    the front and rear transverse structures (11.1, 11.2) are respectively constructed in multiple parts having a middle piece (13) and a left and right end piece (14), which can be fixed thereon in various width positions and to which the respective associated stilt structure (12.1, 12.2) is connected,
    the stilt structures (12.1, 12.2) are respectively constructed in multiple parts having a primary part (19) connected to the associated end piece (14) of the transverse structure (11.1, 11.2) in question and a secondary part, which can be fixed thereon in various height positions and on which the associated wheel-carrying unit (8,9) is disposed;
    no positioning drives are provided that bring about a change of position of the secondary parts (20) and of the primary parts (19) of the stilt structures (12.1, 12.2) or the stilt vehicle relative to one another;
    a lifting device (44), braced on the trailer (43), is provided that acts on central elements of the running and carrying structure (1) of the stilt vehicle, the central elements not being disposed on the wheel carrying units,
    wherein, in the stilt vehicle, positioning drives are provided that cause a change of position of the end pieces (14) and of the middle pieces (13) of the transverse structures (11.1, 11.2) relative to one another.

21. A method for loading a stilt vehicle of a kit onto a trailer (43) used to transport the stilt vehicle and having a cargo bed (42) wherein,
    the stilt vehicle comprises:
        a running and carrying structure (1) provided with four wheels (10.1, 10.2) and having a front transverse structure (11.1) oriented transversely relative to the travel direction (A) and a rear transverse structure (11.2) oriented transversely relative to the travel direction,
        two front stilt structures (12.1) are disposed on opposite sides at ends of the front transverse structure (11.1) and two rear stilt structures (12.2) are disposed on opposite sides at ends of the rear transverse structure (11.2);
        four wheel-carrying units (8,9) that each carry respectively at least on wheel (10.1, 10.2) are disposed on the stilt structures (12.1, 12.2);
        the front and rear transverse structures (11.1, 11.2) are respectively constructed in multiple parts having a middle piece (13) and a left and right end piece (14), which can be fixed thereon in various width positions and to which the respective associated stilt structure (12.1, 12.2) is connected;
        the stilt structures (12.1, 12.2) are respectively constructed in multiple parts having a primary (19) connected to the associated end piece (14) of the transverse structure (11.1, 11.2) in question and a secondary part, which can be fixed thereon in various height positions and on which the associated wheel-carrying unit (8,9) is disposed;
        no positioning drives are provided that bring about a change or position of the secondary part (20) and of the primary parts (19) or the stilt structures (12.1, 12.2) of the stilt vehicle relative to one another;
        a lifting device (44), braced on the trailer (43), is provided that acts on central elements of the running and carrying structure (1) of the stilt vehicle, the central elements not being disposed on the wheel carry units,
    the method comprising:
        the stilt vehicle adjusted to large track width and large ground clearance travels over the trailer (43) or the trailer (43) travels under the stilt vehicle adjusted to large track width and large ground clearance, so that the cargo bed (42) of the trailer (43) is situated between the two tracks of the stilt vehicle;
        the stilt vehicle is supported by means of the lifting device (44), so that the wheels (10) are unburdened,
        then the stilt structures (12) are shortened by positioning the secondary parts (20) of the stilt structures (12) relative to their primary parts (19),
        the stilt vehicle is brought to such a height that its wheels (10) are located at a level situated above the level of the cargo bed (42) of the trailer (43),
        then the end pieces (14) of the front and rear transverse structures (11) are positioned so far inwardly, toward the vehicle middle of the stilt vehicle, that its wheels (10) are situated above the cargo bed (42) of the trailer (43),
        then the stilt vehicle adjusted to a small track width smaller than the large track width and a small ground clearance smaller than the large ground clearance is lowered by means of the lifting device (44) until it stands upright on the cargo bed (42) of the trailer (43).

22. The method of claim 21, wherein the stilt vehicle is lowered by means of the lifting device (44) for shortening of the stilt structures (12) and is then raised again.

* * * * *